United States Patent [19]

Shiba et al.

[11] Patent Number: 5,367,421
[45] Date of Patent: Nov. 22, 1994

[54] CARTRIDGE FOR A RECORDING/REPRODUCING MEDIUM HAVING A TRANSPARENT OR SEMI-TRANSPARENT COVER MEMBER

[75] Inventors: Haruo Shiba, Komoro; Takateru Satoh; Takashi Namioka, both of Saku, all of Japan

[73] Assignee: TDK Corporation, Tokyo, Japan

[21] Appl. No.: 995,827

[22] Filed: Dec. 23, 1992

[30] Foreign Application Priority Data

Dec. 27, 1991 [JP] Japan ............................ 3-112785[U]
Dec. 27, 1991 [JP] Japan ................... 3-358213

[51] Int. Cl.$^5$ ............................................. G11B 23/02
[52] U.S. Cl. .................... 242/347.1; 360/132
[58] Field of Search ............... 360/132, 133; 369/291; 206/444, 387; 242/194, 197, 199

[56] References Cited

U.S. PATENT DOCUMENTS

| D. 292,915 | 11/1987 | Yeh ..................................... 360/132 |
| 5,041,938 | 8/1991 | Mizuno et al. ...................... 360/132 |
| 5,146,376 | 9/1992 | Imanaga et al. .................... 360/132 |
| 5,168,998 | 12/1992 | Satoh et al. ......................... 206/387 |
| 5,219,090 | 7/1993 | Vollmann ............................ 220/525 |
| 5,264,987 | 11/1993 | Doodson et al. ................... 360/132 |

FOREIGN PATENT DOCUMENTS 58-77074 5/1983 Japan .
3250478 11/1991 Japan ................................ 360/132
4-7488 1/1992 Japan .

*Primary Examiner*—John H. Wolff
*Assistant Examiner*—David D. Davis
*Attorney, Agent, or Firm*—Oblon, Spivak, McClelland, Maier & Neustadt

[57] ABSTRACT

A cartridge for receiving therein a recording/reproducing medium has a casing having a label area in which a label is disposed. A transparent cover covers the label and is attached to the casing via a projection and a recess so as to be opened and closed.

3 Claims, 5 Drawing Sheets

CARTRIDGE FOR A RECORDING/REPRODUCING MEDIUM HAVING A TRANSPARENT OR SEMI-TRANSPARENT COVER MEMBER

BACKGROUND OF THE INVENTION

1. Field of the Invention

The present invention relates to a cartridge for a recording/reproducing medium which comprises a casing for receiving therein a recording/reproducing medium such as a medium in a tape form or a disk form.

2. Discussion of Background

Cartridges with or without a shutter have been generally used for media in a form of tape or disk for recording or reproducing which have been used for devices for storing digital data or video devices. A medium for recording and reproducing was received in the casing of a cartridge so as to prevent dust from entering or the surface area from damaging. In such cartridge, a label for displaying the content of recording data was attached to a label area formed in the casing.

However, the conventional cartridge has the following disadvantages. Since the label was exposed at the outer surface area of the casing, it easily became dirty or damaged, so that a written indication disappeared and the appearance became extremely poor due to finger touch. Even though the label was covered by a surface coating for protecting the label, it was easily deteriorated for a shorter period of time and cleanliness was apt to disappear. Further, it was not easy to write in an indication, and it was troublesome to erase the indication when the content of a record was changed. In a case that a label of a bonding type was used, it was impossible or very difficult to replace it by a new one.

SUMMARY OF THE INVENTION

It is an object of the present invention to provide a cartridge for protecting safely a label or an index from becoming dirty or damaging, maintaining good appearance, facilitating the insertion and replacement of the label, providing good treatment and assembling of a cover member, and increasing quality of goods.

The foregoing and other objects of the present invention have been attained by providing a cartridge for receiving therein a recording/reproducing medium which comprising a casing having a label area or an index area in which a label or an index is disposed, and a transparent or semi-transparent cover member for covering the label or the index wherein the cover member is attached to the casing by means of an engaging means so as to be opened and closed.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
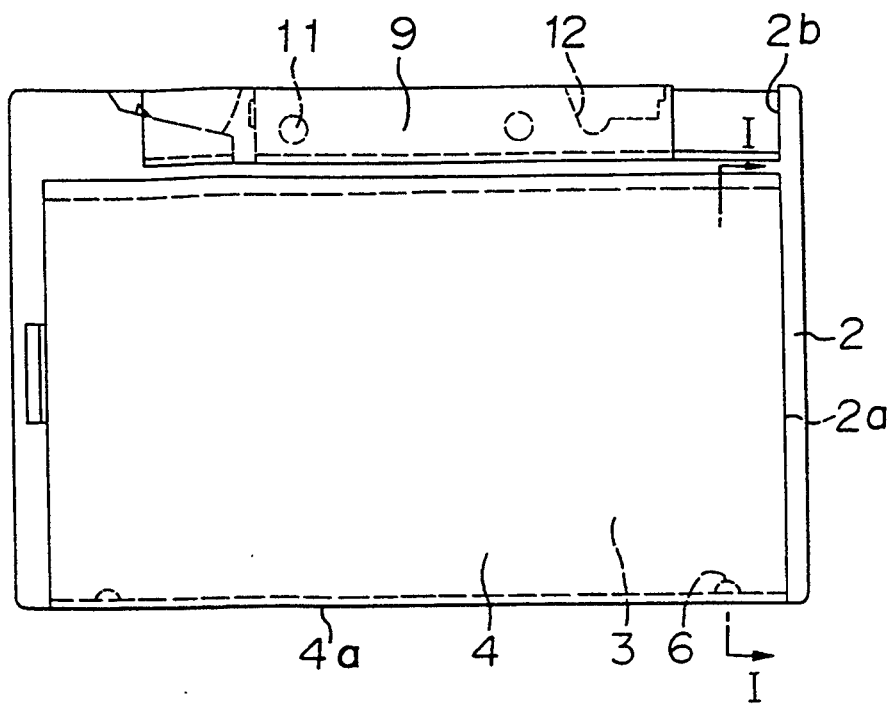
FIG. 1 is a plan view of an embodiment of the cartridge for a recording and reproducing medium according to the present invention.
Figure 2:
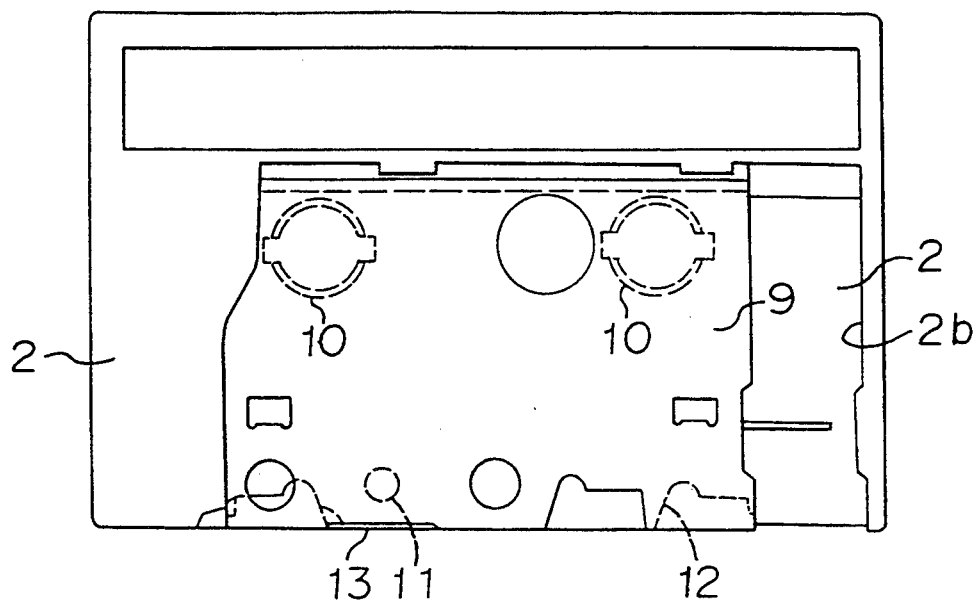
FIG. 2 is a bottom view of the cartridge shown in FIG. 1.
Figure 3:
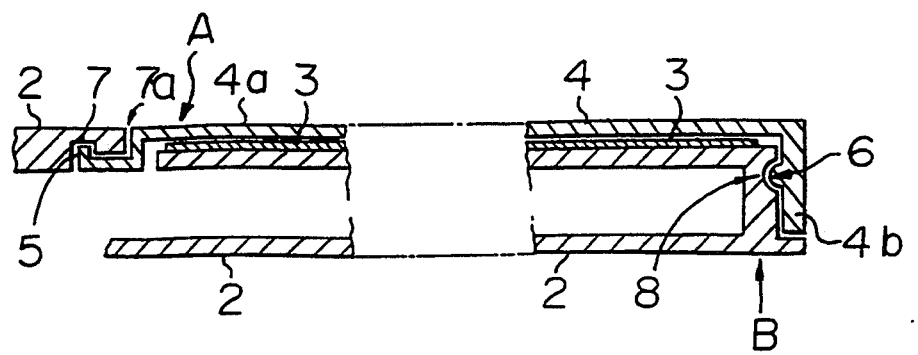
FIG. 3 is an enlarged longitudinal cross-sectional view partly omitted taken along a line I—I in FIG. 1.
Figure 4:
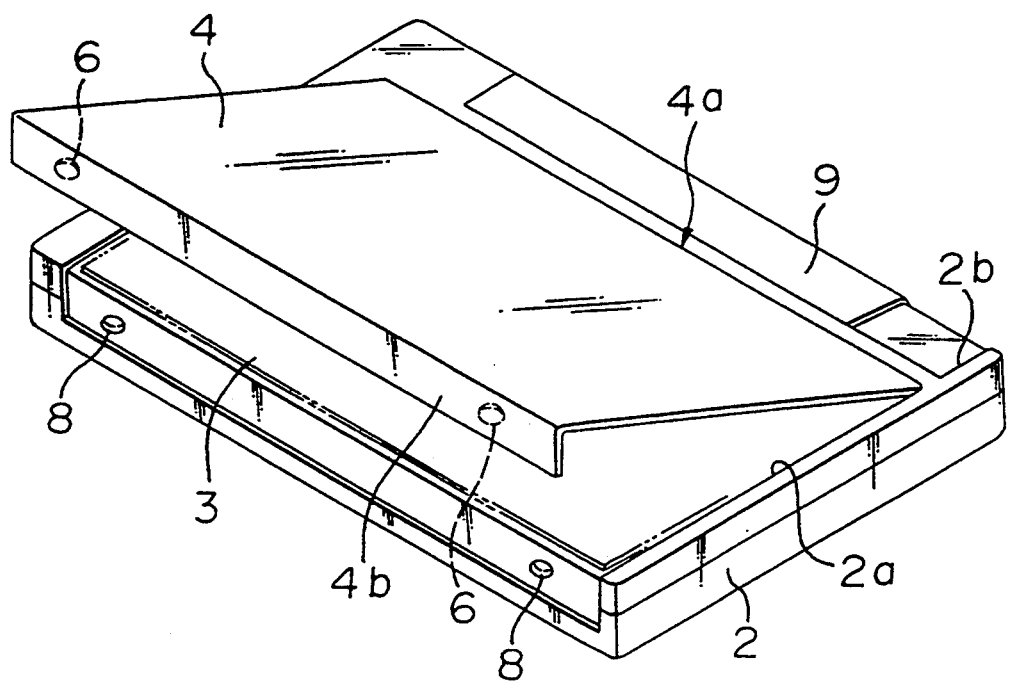
FIG. 4 is a perspective view showing a state of use of the cartridge shown in FIG. 1.
Figure 5:
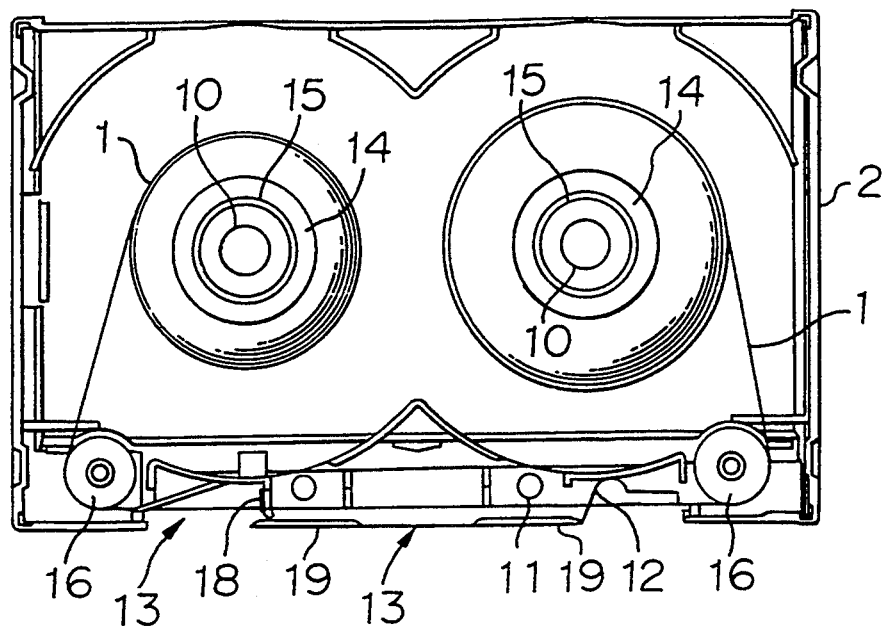
FIG. 5 is a plan view of the lower half casing to show the inside of the casing and accessories received therein.

FIGS. 1 through 5 show a first embodiment of the cartridge according to the present invention.

The cartridge of the first embodiment has a casing 2 for receiving therein a recording/reproducing medium 1. The casing 2 has a label area 2a in which a label 3 or an index is disposed or inserted. A transparent or semi-transparent cover member 4 for covering the label 3 is detachably attached to the casing 2 by means of two kinds of engaging means A, B.

The cover member 4 is formed of a plate-like member having a substantially L-shape in cross section and has projections 5, 6 at an edge region of the upper plate portion 4a and an inner region of the side plate portion of the cover member respectively which are capable of engaging with recesses 7, 8 formed in an inner region of the upper surface portion and an outer region of a side surface portion of the casing 2.

The engaging means A comprises a slit 7a formed near an edge region of the label area so as to be capable of receiving therein an end portion of the cover member and a recess 7 formed in an inner region of the upper plate portion of the casing, the recess 7 being adjacent to the slit 7a. The engaging means A may be formed at both the central portion of the cover member and the casing, or two engaging means A may be formed at both side regions of the cover member 4 and the casing 2.

In disposing the label 3 in the label area 2a of the casing 2, the cover member 4 is removed or opened from the casing 2, and the label 3 is directly inserted or attached to the casing 2. Then, the projection 5 of the cover member 4 is fitted to the recess 7 formed in the casing 2, and the cover member 4 is closed on the casing so that the projection 6 of the cover member 4 is press-fitted to the recess 8 of the casing 2. Thus, the cover member 4 is just fixed to the casing while the label 3 is stably disposed in the label area 2a on the outer surface of the casing 2.

The casing 2 is adapted to receive therein the recording/reproducing medium 1 in a form of tape or disk and is provided with a shutter 9 in a shutter area 2b formed in the casing in a slidable manner whereby openings formed in the casing 2 such as driving shaft insertion openings 10, a case position determining opening 11, capstan insertion openings 12 and front openings 13, are opened and closed. The shutter 9 is forced in one direction by means of a spring (not shown) provided in the casing 2 so that the shutter 9 can be moved to the original position.

The casing 2 consists of an upper and lower half casings in which a pair of hubs 14 around which a tape-like recording/reproducing medium 1 is wound, for instance, are supported at hub-fitting peripheral wall portions 15 in a rotatable manner. The casing 2 is also provided with tape guides 16, partition walls 17, guide pieces 18 and outer front walls 19 in one piece which are arranged in the tape running path along which the medium 1 runs from one of the hubs 14 to the other. The front openings 13 are formed at both sides of the outer front walls 19 arranged in parallel. The capstan insertion openings 12 are formed adjacent the position determining openings 11. The shutter 9 has windows at positions corresponding to the above-mentioned structural elements.

In the above-mentioned embodiment, the cartridge has been explained as used for a tape cassette. However, the cartridge of the present invention can be applied to a cartridge for optical disk or another hard disk.

In the above-mentioned first embodiment of the present invention, since a transparent or semi-transparent cover member is detachably attached to a casing so as to cover a label or an index by means of engaging means, there is no danger of staining or damaging of the label or index disposed at the outer surface of the casing, and the label or index is safely protected, the appearance can be maintained in good condition, and the attachment or the replacement of the label can be easy. Further, the cartridge having high quality and easy handling as well as the cover member of easily assembling can be provided.

Figure 6:
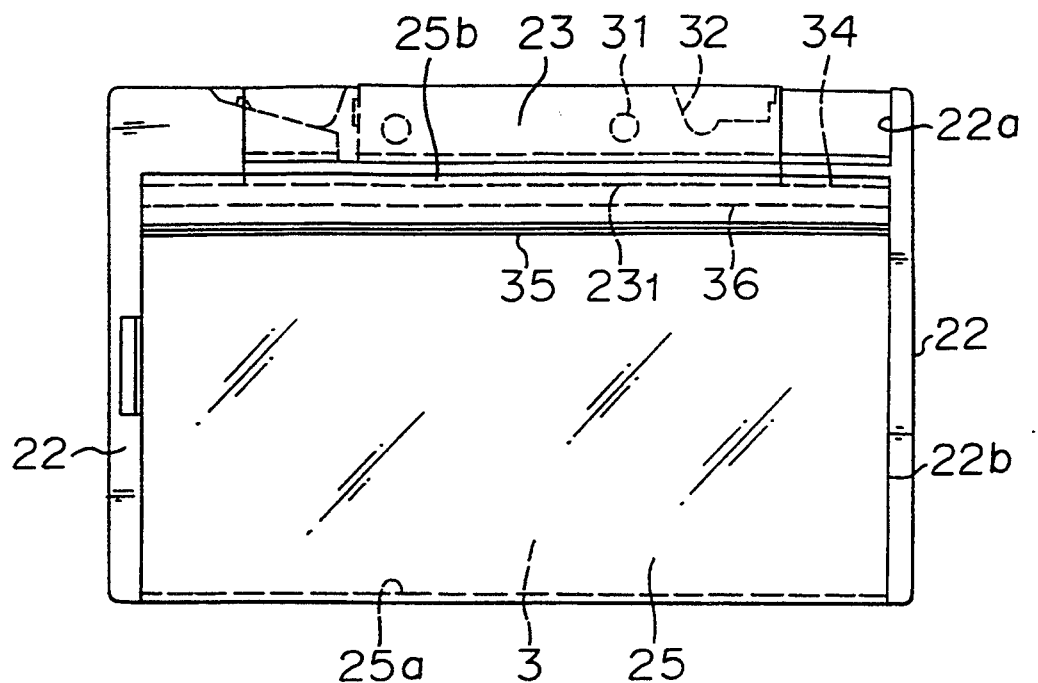
FIG. 6 is a plan view of another embodiment of the cartridge according to the present invention.
Figure 7:
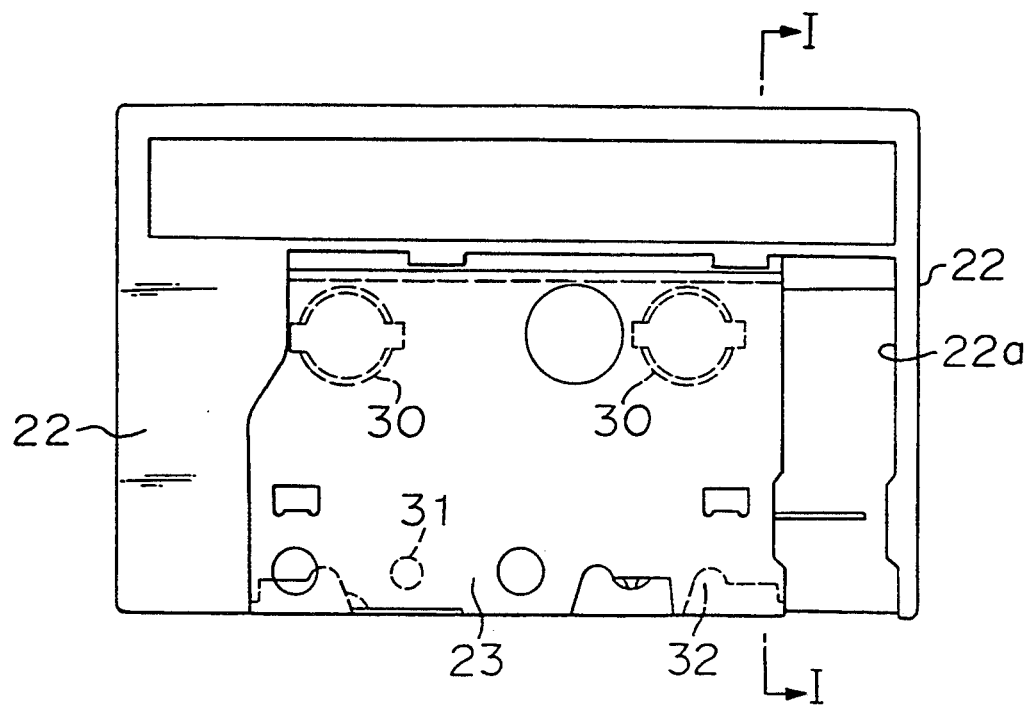
FIG. 7 is a bottom view of the cartridge shown in FIG. 6.
Figure 8:
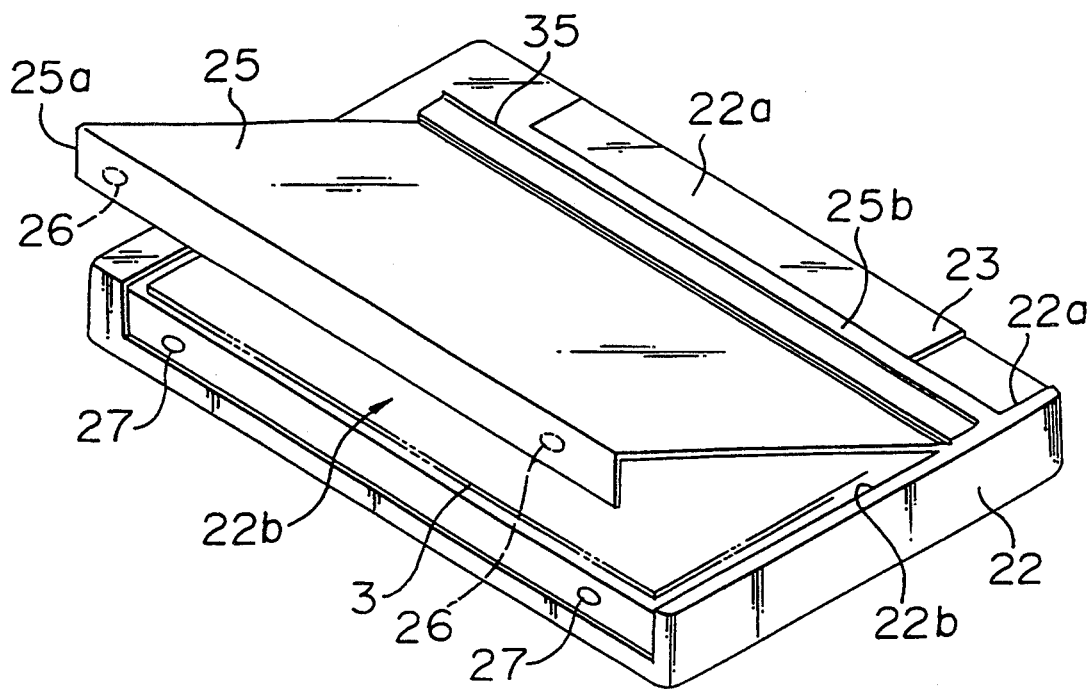
FIG. 8 is a perspective view showing a state of use of the cartridge shown in FIG. 6.
Figure 9:
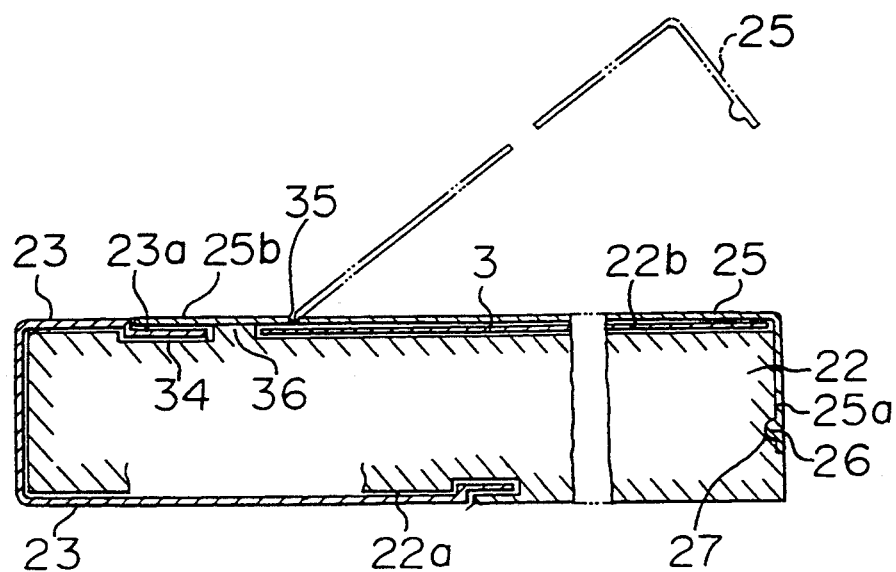
FIG. 9 is an enlarged longitudinal cross-sectional view taken along a line I—I in FIG. 7.

The second embodiment of the cartridge of the present invention will be described with reference to FIGS. 6 through 9. The construction of the second embodiment is generally same with that of the first embodiment, and description of the same or identical portions is omitted.

In the second embodiment, improvement is made so as to prevent dust or the like from entering in the casing through a gap around the shutter.

In FIGS. 6 through 9, the casing 22 of the cartridge of the second embodiment has a slide area 22a for a shutter 23 and a label area 22b in which a label 3 or index is disposed. A transparent or semi-transparent cover member 25 for covering the label 3 is attached to the casing 22 so as to be capable of opening and closing by melt-bonding an edge portion of the cover member 25 while a gap to allow the insertion of the label is remained. A free end 23a of the shutter 23 is slidably disposed beneath the end portion of the cover member 25 which is melt-bonded to the casing.

The shutter 23 is formed of a plate-like member having a substantially U-like shape and is slidably fitted to the slide area 22a so as to open and close driving shaft insertion openings 30, a case position determining opening 31, capstan insertion openings 32 and front openings 33 formed in the casing 22. The free end 23a of the shutter 23 is slightly bent and the bent portion is fitted to a guide groove 34 formed in the casing 22 so that the bent free end portion 23a is fitted in the guide groove 34 which is beneath the one end of the cover member 25 melt-bonded to the casing 22. The shutter 23 is forced into one direction by means of a spring (not shown) disposed in the casing so that it can be moved to the original position.

The cover member 25 for covering the label 3 is a plate-like body of synthetic resin having a substantially L-shape in cross section, and has a hinge portion 35 of a reduced wall thickness which is formed by forming a V-groove in the upper surface of the cover member which is in parallel to and spaced apart from an edge of the cover member 25. The cover member 25 is provided with projections 26 to be engaged with the casing at both sides of the side wall portion 25a of the cover member. On the other hand, recesses 27 for engagement are formed at portions corresponding to the projections 26 in the casing 22 so that the cover member 25 can be engaged with the casing 22. The free end portion 25b opposite the side wall portion 25a of the cover member 25 is melt-bonded to a cover fitting wall portion 36 which is formed between the label area 22b and the guide groove 34 for fitting the free end 25a of the shutter so that the one end 25b of the cover member 25 is extended above the free end 23a of the shutter, whereby the rising or the deformation of the cover member 25 can be prevented.

In the second embodiment of the present invention, since a transparent or semi-transparent cover member for covering a label is melt-bonded at one end to the casing while a gap for the insertion of a label in the label area of the casing is remained wherein the cover member is opened and closed with respect to the casing, and an end of the cover member is extended to a position where a free end of the shutter is disposed beneath the one end of the cover member, the assembling of the shutter in the casing can be easy to thereby increase productivity. Further, the shutter can be smoothly and safely operated while the movement of the shutter can be controlled by one end of the cover member and the entering of dust into the casing can be prevented. There is no danger of the rising or deformation of the shutter. A damage or stain of the label can be prevented so that durability can be prolonged. The insertion or replacement of the label can be easily done. There is no danger of causing adverse affect to a recording/reproducing medium received in the casing or deterioration of the appearance of the casing. Further, the cartridge of the present invention can be handled safely and the label can be simply disposed or removed.

Obviously, numerous modifications and variations of the present invention are possible in light of the above teachings. It is therefore to be understood that within the scope of the appended claims, the invention may be practiced otherwise than as specifically described herein.

What is claimed is:

1. A cartridge having therein a recording/reproducing medium and comprising a casing having the medium therein, said casing having means for permitting passage of a recording/reproducing medium drive element into the casing to drive the recording/reproducing medium in said casing, said casing further comprising a label area or an index area in which a label or an index is disposed, and a transparent or semitransparent cover member for covering said label or said index, wherein the cover member is attached to the casing by engaging means engaging between said transparent or semi-transparent cover member and said casing so as to open and close said cover member, wherein said casing has a shutter and an area for sliding the shutter, wherein said cover member comprises a movable cover portion and an end portion formed as one piece with the movable cover portion and separated therefrom by a hinge portion, wherein the end portion of said cover member is attached to the casing, wherein a gap for inserting the label or index is formed in the label area, and wherein the end portion of the cover member extends above an end portion of the shutter so as to cover the shutter and guide the movement thereof.

2. The cartridge according to claim 1, wherein said cover member is formed of a resinous plate-like member having a substantially L-shape in cross-section, wherein said hinge is comprised by a reduced wall-thickness of the cover member and is formed by a V-groove which is in parallel to and spaced apart from an upper edge of the cover member, and wherein a projection for engaging with the casing is formed at an end region of the cover member.

3. The cartridge according to claim 1, wherein said shutter is formed of a plate-like member having a substantially U-shape, and has a bent free end portion which is received in a guide groove formed in the casing so that the shutter is slidable in the slide area so as to open and close driving shaft insertion openings, a casing position determining opening, capstan insertion openings and front openings formed in the casing.

* * * * *